United States Patent Office 3,274,162
Patented Sept. 20, 1966

3,274,162
EPOXY TRIOXANES
Elliot Bergman, Berkeley, Calif., assignor to Shell Oil
Company, New York, N.Y., a corporation of Delaware
No Drawing. Filed Feb. 8, 1963, Ser. No. 257,096
16 Claims. (Cl. 260—78.4)

This invention relates to a novel class of polyepoxy compounds and to the method of their production. More particularly it relates to a class of novel epoxy-substituted trioxanes, from which superior epoxy resins may be prepared.

A wide variety of compounds containing epoxy, i.e., oxirane, groups has found utilization in the production of epoxy resins. These include glycidyl ethers and esters prepared by reaction of epichlorohydrin and related materials with hydroxylic compounds, and various condensation products derived from glycidaldehyde.

It has been found that superior cured products are obtained from epoxy compounds having a high epoxy functionality, that is, a multiplicity of epoxy linkages within a single molecule. Frequently the degree of epoxy functionality is a critical factor in determining both the properties of the resins produced when the epoxy compound is cured and the most suitable curing agents to produce the resins.

It is therefore a principal object of this invention to provide a novel class of epoxy compounds possessing three epoxy groups and a method whereby such compounds are produced. A more specific object is to provide for a class of novel s-trioxanes having epoxy-containing substituents, as is the provision of the method for the production of such epoxy trioxanes. An additional object is to provide for superior epoxy resins produced by curing these epoxy trioxanes.

These objects are accomplished in the present invention through the provision of 2,4,6-tris(epoxyalkyl)-trioxanes and the method of their production. Preferred trioxanes have the formula

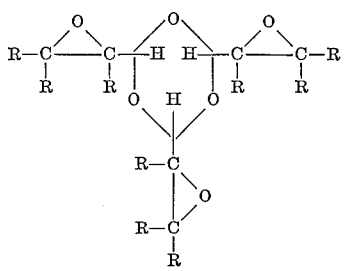

where R is hydrogen, alkyl or aryl. Although these trioxanes may be considered to be trimers of substituted or unsubstituted glycidaldehyde, methods are not presently available for direct trimerization. Preparative methods, therefore, consist of the trimerization of a related aldehyde and subsequent synthetic operations to impart the desired epoxy structure.

In the process of the present invention, these methods comprise adding hydrogen halide to an α,β-olefinically unsaturated aldehyde, trimerizing the resulting β-haloaldehyde to form the corresponding cyclic trimer, i.e., the 2,4,6-tris(2-haloalkyl)-trioxane, dehydrohalogenating the haloalkyltrioxane to form the corresponding 2,4,6-tris-(1-alkenyl)-trioxane, and epoxidizing the unsaturated trioxane to form the desired 2,4,6-tris(1,2-epoxyalkyl)-trioxane product.

The aldehydes suitable for the process of the preferred invention are those aldehydes having α,β-olefinic unsaturation. Preferred aldehydes of this class are represented by the formula

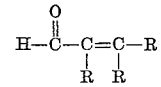

where R is hydrogen, alkyl having from 1 to 10 carbon atoms, or aryl of up to 10 carbon atoms. When R is alkyl, the radical may be branched or straight chain, and exemplary alkyl R radicals include methyl, ethyl, propyl, isopropyl, tert-butyl, tert-amyl, hexyl, octyl, decyl and the like, while aryl R groups include phenyl, tolyl, xylyl and p-tert-butylphenyl.

Exemplary aldehydes are 2-dodecenal; 4,4-dimethyl-2-pentenal; α-phenylacrolein; 2,4-dimethyl-2-hexenal; 5,6-diethyl-2-octenal, cinnamaldehyde and the like. The preferred aldehydes to be used in the process of the invention, however, are those aldehydes wherein R is hydrogen or straight chain lower alkyl having from 1 to 6 carbon atoms. Illustrative of these preferred aldehydes are, among others, acrolein, crotonaldehyde, methacrolein, 2-hexenal-2-octenal, 2-ethyl-2-butenal, 2-methyl-3-ethyl-2-hexenal and 2,3-dimethyl-2-pentenal. Particularly preferred for the ease of its reaction and the desirable properties of the products obtained therefrom is acrolein.

To the α,β-olefinically unsaturated aldehyde is added hydrogen halide. Although hydrogen halides such as hydrogen fluoride, hydrogen bromide and hydrogen iodide are operable, the preferred hydrogen halide is hydrogen chloride. These halides are utilized as gases, liquids or in solution, depending upon the particular mode of hydrogen halide addition employed.

The hydrogen halide addition may be conducted in the liquid or vapor phase. In an exemplary liquid phase addition, the aldehyde is dissolved in a suitable solvent, e.g., ethers, hydrocarbons or halogenated hydrocarbons, and treated with anhydrous hydrogen halide as by passing the gaseous halide into the solution. Alternatively, the hydrogen halide is dissolved in the same or some other miscible solvent and the addition is effected by mixing the solutions or by adding one solution to the other in increments.

Following such an addition procedure, the β-haloaldehyde is recovered by conventional methods such as fractional distillation and trimerized, customarily by treatment with a mineral acid catalyst.

In a preferred modification, the hydrogen halide addition is conducted principally in the vapor phase, and the subsequent trimerization is performed without the necessity of isolating β-haloaldehyde, removal of excess solvents, or other undesirable features of many liquid phase processes. In such a preferred process, aldehyde and hydrogen halide vapors are mixed, as by means of a jet, at the top of a reactor tube, the upper portion of which is customarily heated and the lower portion of which is cooled. Hydrogen halide addition takes place during downward passage, either in the vapor phase, or within the liquid film formed on the sides of the tube. Although the optimum temperature for the addition process will depend upon the particular unsaturated aldehyde and hydrogen halide that are employed, temperatures from about 0° C. to about 150° C. are, in general, satisfactory, while temperatures from about 0° C. to about 50° C. are to be preferred. The aldehyde and hydrogen halide may be mixed in any convenient ratio. From consideration of the addition reaction alone, little is to be gained by using a ratio other than stoichiometric, that is, one mole of hydrogen halide for each mole of aldehyde, as the reaction proceeds satisfactorily when stoichiometric amounts of reactants are used. To facilitate the subsequent trimerization, however, it is preferred that a molar excess of hydrogen halide be present. Although this excess may be as high as 50% without harmful effect on the reaction, a molar excess of up to about 15% is usually sufficient.

The trimerization reaction occurs spontaneously in the presence of excess hydrogen halide when the β-haloaldehyde is cooled. Probably, partial trimerization occurs during passage through the reactor, but to insure complete reaction, the condensed vapors from the reactor are allowed to remain in contact with the excess hydrogen halide until trimerization is complete. Although it is possible to effect trimerization at temperature from as low as −50° to as high as 150° C., for conveniences, temperatures at or near room temperature are utilized. Temperatures from about 0° C. to about 40° C. are therefore to be preferred. The trimer is recovered in good yield in a high state of purity through removal of the excess hydrogen halide, for example, by distillation at reduced pressure.

The trimers thus formed are 2,4,6-tris(2-haloalkyl)-trioxanes having the formula

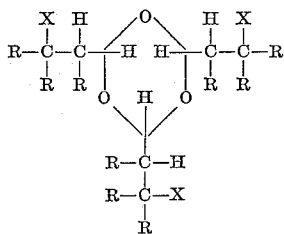

wherein R has the previously stated significance and X represents a halogen atom, e.g., chlorine, bromine, fluorine and iodine. Examples of the trimer products include 2,4,6-tris(2-chloroethyl)-trioxane;
2,4,6-tris(2-bromopropyl)-trioxane;
2,4,6-tris(2-chloro-2-methylethyl)-trioxane;
2,4,6-tris(2-fluoro-1,2-dimethylbutyl)-trioxane;
2,4,6-tris(2-bromooctyl)-trioxane;
2,4,6-tris(2-chloro-1,2-dipropylamyl)-trioxane and
2,4,6-tris(2-chloro-2-phenylethyl)-trioxane.

The 2,4,6-tris(2-haloalkyl)-trioxane is dehydrohalogenated while avoiding de-trimerization by treatment with base. Conventional dehydrohalogenation methods include reacting the halide, either as a pure substance or in alcoholic solution, with an alcoholic solution of the base. An alternate method consists of dissolving the halide in a suitable solvent, usually an alcohol, and dropping the mixture upon heated base. When both the halide and base are in solution, the reaction is conducted by mixing the solutions or by adding one solution to the other. Frequently, external heating is provided, and the dehydrohalogenation is conducted at the reflux temperature of the solution.

Alcohols employed to prepare the basic solutions are the lower alkanols, e.g., methanol, ethanol, propanol, isopropanol, tert-butanol and the like, while suitable bases include alkali and alkaline earth hydroxides, e.g., sodium hydroxide, potassium hydroxide, cesium hydroxide and barium hydroxide; the corresponding oxides such as sodium oxide, potassium oxide, calcium oxide and cesium oxide; alkali metal alkoxides such as sodium methoxide, potassium ethoxide, cesium isopropoxide, potassium tert-butoxide and sodium n-propoxide; alkali metal amides, e.g., sodamide and potassium amide; organic bases such as the tertiary amines including trimethyl amine, triethyl amine and pyridine, polyfunctional amines such as guanidine and quaternary ammonium hydroxides including tetramethylammonium hydroxide. Preferred bases for the process of the present invention are the alkali metal alkoxides, with alkoxides of secondary and tertiary alcohols being further preferred. Especially useful are alkali metal alkoxides prepared from tertiary alcohols, and unexpectedly superior results are obtained through the use of these alkoxides as the base in the dehydrohalogenation process.

Thus, alcoholic solutions of alkali metal tert-alkoxides are the most preferred class of basic solutions for dehydrohalogenating the tris(haloalkyl)-trioxanes of the present invention. Although primary alkoxides and to a lesser extent secondary alkoxides are prepared quite easily by dissolving an alkali metal hydroxide in the alcohol, the slight solubility of alkali metal hydroxides in tertiary alcohols precludes any such simple process for the preparation of tertiary alkoxides. These tertiary alkoxides are normally prepared by reaction of alkali metal with the appropriate alcohol, a process that is inherently expensive and time-consuming.

It has now been found, however, that alkali metal alkoxides of tertiary alcohols may be prepared in situ under proper conditions. Alkali metal hydroxides, as normally employed in pellet, flake or granulated form, have too slow a rate of dissolution to allow the equilibrium mixture of base and alcohol, containing only a slight amount of dissolved base, to serve as if it were entirely alkali metal alkoxide. However, if the alkali metal hydroxide in finely powdered form is employed as a suspension in the tertiary alcohol and the suspension is vigorously agitated, the rate of dissolution approaches the rate of dehydrohalogenation, and the mixture prepared in this manner serves as if it were entirely an alkali metal alkoxide solution.

Therefore, the preferred modification of the dehydrohalogenation process is to react the tris(haloalkyl)-trioxane with a suspension of finely powdered alkali metal hydroxide in tertiary alcohol. The powdered hydroxide is prepared by grinding a more coarsely divided form or by vigorously agitating, under reflux, a mixture of the desired base and tertiary alcohol. Under conditions of the later technique, the alcohol rapidly becomes saturated with hydroxide. As the hydroxide crystallizes from solution, due to the dynamic nature of the equilibrium thus established, it crystallizes in a finely divided, powdered form. The suspension that results when all the hydroxide has been converted to such a powdered form is suitable for direct use as the dehydrohalogenating agent.

It is preferred that this suspension contain a molar excess of alcohol, although suspensions containing a molar ratio of base to alcohol that are stoichiometric or greater are operable. Molar excesses of alcohol from one to tenfold over the base are generally satisfactory.

The basic suspension thus prepared is reacted with an alcoholic solution of the trimer. Best results are obtained when the basic suspension and the trimer solution are prepared from the same alcohol, although the use of dissimilar but miscible alcohols is also satisfactory.

The entire amounts of trimer solution and base suspension may be mixed at the start of reaction, but it is preferred that one be added to the other in increments over a period of several hours. Best results are obtained by adding the trimer solution to the solution of base, as it is desired that base be present in excess at all times. An equivalent amount of base is one mole for each mole of halide group, which in the case of the tris(haloalkyl)-trioxane, comprises three moles of base for each mole of trimer. While molar ratios of base to trimer from about 3:1 to about 30:1 are satisfactory, molar ratios of from 3:1 to about 9:1 give the best results.

The dehydrohalogenation reaction is conducted at temperatures ranging from about room temperature, i.e., 20–30° C., to the reflux temperature of the solution, with best results obtained at or near reflux temperature. Temperatures from 30° to 100° C. are preferred. At the conclusion of trimer addition, reaction temperature is customarily maintained for a short time to ensure complete reaction, and the dehydrohalogenated product is recovered by conventional means such as fractional distillation, fractional crystallization or selective extraction.

The dehydrohalogenated product is a 2,4,6-tris(1-alkenyl)-trioxane having the formula

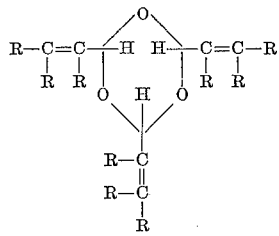

wherein R has the previously stated significance.

These alkenyl-substituted trioxanes are epoxidized to tris(epoxyalkyl)-trioxanes. The epoxidation may be brought about in a variety of ways, but, as the trioxane ring is sensitive to strongly acidic conditions, preferred methods are those conducted under basic, neutral or mildly acidic conditions. Conditions wherein the pH of the epoxidation solution does not fall below 4 are generally satisfactory. To prevent undesirable secondary reaction the pH of the reaction solution is maintained below about 10, and therefore reaction conditions in which the pH is above 4, but below 10, are preferred.

The epoxidation may be conducted by reacting the unsaturated trimer with a basic solution of hypohalite, e.g., hypochlorite. In this procedure, the elements of hydroxyl and halogen are added to the olefinic double bond to form a vic-halorydrin which, under the basic conditions of the reaction, eliminates hydrogen halide to form the desired epoxy structure. Alternatively, the epoxidation may be effected by treatment of the unsaturated trimer with a buffered solution of a peracid. Exemplary peracids include, among others, peracetic acid, perpivalic acid and perbenzoic acid, which may be reacted with the trimer as performed compounds, or prepared in situ by, for example, reaction of the corresponding acid with hydrogen peroxide.

The preferred method of epoxidation comprises reacting the unsaturated trimer with a solution of hydrogen peroxide and a nitrile that is free from reactive carbon-carbon double bonds.

Solvents that are suitable for the preferred method of epoxidation are non-reactive and free from polymerizable ethylenic linkages. Such solvents include aromatic and aliphatic hydrocarbons such as benzene, toluene, xylene, pentane, hexane and cyclohexane; the alcohols such as monohydric alcohols, e.g., methanol, ethanol, isopropanol and tert-butanol, and the polyhydric alcohols including ethylene glycol, trimethylene glycol and glycerol; ketones such as acetone, methyl ethyl ketone and methyl isobutyl ketone; and ethers including diethyl ether, dibutyl ether, dioxane and tetrahydrofuran. An additional solvent is, of course, water which is encountered when aqueous solutions of hydrogen peroxide are used. When water is present, co-solvent is generally necessary to impart sufficient solubility to the organic materials present. Suitable co-solvents for this purpose are those that are miscible with water, such as the lower alkanols and ethers including tetrahydrofuran and dioxane. Monohydric alcohols constitute the preferred class of epoxidation solvents.

The preferred epoxidizing agent is, as stated previously, a mixture of hydrogen peroxide and a nitrile. It is believed that the peroxide and the nitrile react initially to produce a peroxycarboximidic acid, which is the active epoxidizing species. While the peroxide and nitrile may be reacted prior to contact with the unsaturated trioxane, thus preforming the peroxycarboximidic acid, it is preferred to introduce the peroxide and nitrile separately, thereby forming the reactive species in situ.

The nitriles employed in the epoxidation process are those wherein the nitrile group is the only group reactive to hydrogen peroxide. The nitriles, therefore, are free from non-aromatic unsaturation. Illustrative of such nitriles are the saturated aliphatic nitriles such as acetonitrile, propionitrile and capronitrile; cycloaliphatic nitriles such as cyclohexylacetonitrile; and aromatic nitriles such as benzonitrile, phthalonitrile, p-toluic nitrile, 2-cyanonaphthalene and the like. Preferred nitriles are the aromatic nitriles and particularly preferred is benzonitrile.

The hydrogen peroxide is used in any convenient form. Most easily employed are commercial aqueous solutions of from about 30% to about 75% concentration.

The epoxidation process is conducted in the presence of sufficient base or buffering agent to maintain reaction conditions that are neither overly basic nor overly acidic, e.g., a pH from about 4 to about 10. Suitable buffering agents are salts of strong bases and weak acids, as illustrated by sodium bicarbonate, potassium bicarbonate, sodium citrate, calcium acetate, trisodium phosphate and the like, while bases satisfactory for maintaining the desired pH include the alkali metal hydroxides, e.g., potassium hydroxide, sodium hydroxide, and cesium hydroxide; the alkaline earth hydroxides such as barium hydroxide; and the alkali metal oxides such as sodium and potassium oxides. Such organic bases as the alkyl amines and phenoxide salts may also be used, although because of their relatively high cost, they are not to be preferred.

The reactants of the epoxidation process may be introduced in any convenient order. One advantageous method when employing the preferred in situ procedure comprises adding hydrogen peroxide to a stirred solution of the unsaturated trimer and nitrile in the presence of sufficient base to bring the pH within the desired range. Additional base may be added during the reaction, although it is equally desirable to have all the required base present at the start of reaction.

Alternatively, the reaction may be carried out by preforming the peroxycarboximidic acid and adding the olefinic reactant to the acid in the presence of the required base.

Whether preformed or prepared in situ, at least one mole of epoxidizing agent is required for each mole of epoxy group produced therewith. Thus, for the olefinic trimers of the present invention, three moles of peroxycarboximidic acid are required for each mole of trimer. Although lesser amounts of epoxidizing agent will, in part, be operable, it is preferred that at least a stoichiometric amount be used. Thus, ratios of peroxycarboximidic acid to ethylenic linkage from about 1:1 to about 4:1 are to be preferred. When the peracid is formed in situ, preferred molar ratios of nitrile to hydrogen peroxide are from about 0.25:1 to about 1:1.

In general, the temperature of the reaction is not critical. Temperatures from about 0° C. to the reflux temperature of the mixture are satisfactory. For convenience, temperatures at or near room temperature, such as from about 15° C. to about 40° C. are to be preferred.

Following epoxidation, the desired epoxy product is recovered by conventional methods, such as by distillation or by selective extraction.

The epoxy products have the formula

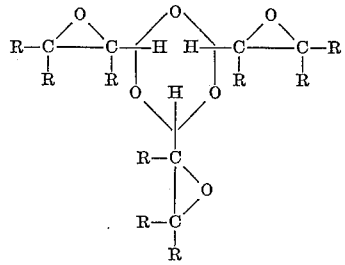

wherein R has the previously stated significance. Exemplary 2,4,6-tris(1,2-epoxyalkyl)-trioxanes include among others, 2,4,6-tris(1,2-epoxyethyl)-trioxane;
2,4,6-tris(1,2-epoxypropyl)-trioxane;
2,4,6-tris(1,2-epoxyoctyl)-trioxane;

2,4,6-tris(1,2-epoxy-2-methylhexyl)-trioxane;
2,4,6-tris(1,2-epoxy-1,2-diethylbutyl)-trioxane;
2,4,6-tris(1,2-epoxy-2-phenylethyl)-trioxane;
2,4,6-tris(1,2-epoxy-1-methyl-2-ethylhexyl)-trioxane;
2,4,6-tris(1,2-epoxy-1-methylethyl)-trioxane and
2,4,6-tris(1,2-epoxy-1-methylpropyl)-trioxane.

As previously stated, the epoxy trimers of the invention are materials from which superior epoxy resins may be prepared. The epoxy trimers have the structural advantage of offering a closely knit, trifunctional epoxy character that imparts to the resins produced therefrom qualities of strength and resistance to the detrimental effects of heat.

Through the use of a variety of curing agents, the epoxy compounds may be polymerized, but alternatively, they may be mixed with other epoxy compounds such as glycidyl ethers, glycidyl esters, epoxy alcohols and the like and then cured to form copolymeric resins.

Preferred curing agents are those having active hydrogen atoms, such as the amines, e.g., trimethylenediamine, diethylenetriamine, diethylamine and p-phenylenediamine; polyamides including the Versamids which are reaction products of polyamines and polymerized fatty acids; and polycarboxylic acids including oxalic and phthalic acids. Other suitable curing agents include tertiary amines such as triethylamine, trimethylamine and benzyldimethylamine; polycarboxylic acid anhydrides, e.g., dodecenylsuccinic anhydride, methylnadic anhydride, phthalic anhydride and hexahydrophthalic anhydride; and metal salts as illustrated by the zinc, copper and potassium salts of fluorboric, sulfuric and phosphoric acids. In addition, the polysulfide resins, Lewis acids such as aluminum chloride and stannic chloride, and metallic hydroxides, e.g., sodium hydroxide and potassium hydroxide, are also satisfactory curing agents.

The amounts of curing agent required for curing the epoxy-trioxanes will vary over a considerable range, depending upon the agent selected. With curing agents having active hydrogen atoms such as the amines, amounts will vary up to and include stoichiometric amounts, that is, one mole of active hydrogen for each mole of epoxy group to be reacted. The other curing agents are preferably employed in amounts ranging from 1 to 20%.

The epoxy trimers are cured by mixing with the curing agent. Although the cure will take place at room temperature, the cure is accelerated by the application of heat, such as at temperatures from about 50° to about 200° C. The cured products thus obtained are hard, infusible materials that are useful in adhesives, laminates and castings.

To illustrate the method of preparation and the usefulness of the epoxy-substituted trioxanes of the present invention, the following examples are provided. It should be understood that they are not to be regarded as limitations, for the teachings thereof may be varied as will be understood by one skilled in the this art.

Example I

To 285 ml. (4.1 moles) of acrolein was added 150 g. (4.1 moles) of anhydrous hydrogen chloride over a period of about 2.2 hours. The acrolein vapor and anhydrous hydrogen chloride were mixed in a jet at the top of a vertical tube cooled with tap water. A flow of about 2 moles per hour was maintained by a rotameter; approximately 1.2 g. of hydrogen chloride was added per minute. At the end of 2.2 hours there was formed 380 g. of a clear water-white liquid of beta-chloropropionaldehyde.

The monomeric beta-chloropropionaldehyde obtained was allowed to trimerize at a temperature of about 0° C. The resultant trimer, 2,4,6-tris(2-chloroethyl)-trioxane was obtained as a white solid, M.P. 25–30° C.

Purification by distillation (B.P. 135° C. at 1–3 mm.) and subsequent recrystallization from methanol gave white crystals, M.P. 35.5–36.0° C.

Example II

When crotonaldehyde is dissolved in chloroform and reacted with anhydrous hydrogen bromide, good yields of 3-bromobutanal are obtained. Following solvent removal, treatment of the residue with additional hydrogen bromide results in the formation of 2,4,6-tris(2-bromopropyl)-trioxane.

Example III

Into a reaction vessel were charged 24.2 g. of potassium hydroxide pellets and 200 g. of tert-butyl alcohol. The mixture was heated to reflux and vigorously stirred for 8 hours. At the end of this time, the potassium hydroxide was in a finely powdered form. A solution of 20 g. 2,4,6-tris(2-chloroethyl)-trioxane in 50 g. of tert-butyl alcohol was added dropwise over a period of 1.5 hours while the reaction solution was maintained at reflux temperature. Reflux was maintained for an additional hour, after which the reaction mixture was clear in appearance.

The solution was stripped of solvent and the residue extracted two times with 200 ml. of petroleum ether. The extract was washed two times with approximately equal volumes of water to leach out the residual solvent and the petroleum ether was removed at room temperature and 1 mm. to yield 10.4 g. of white crystals, M.P. 45–47° C.

Analysis indicated the product to be 2,4,6-tris-vinyltrioxane.

Calc. for $C_9H_{12}O_3$: percent C, 64.27; percent H, 7.19; percent Cl, 0.00; bromine number, 2.88. Anal.: percent C, 64.2; percent H, 7.3; percent Cl, <0.2; bromine number, 2.77.

Example IV

When 2,4,6-tris(2-chloro-2-phenylethyl)-trioxane is dissolved in methanol and the resulting solution is refluxed with a stoichiometric amount of potassium hydroxide in methanol, good yields of 2,4,6-tris(2-phenylvinyl)-trioxane are obtained upon work-up.

Example V

Into a reaction vessel were charged 11.2 g. of 2,4,6-trisvinyl-trioxane, 120 cc. of methanol, 26 g. of benzonitrile, 17 g. of 50% hydrogen peroxide and 4 g. of potassium bicarbonate. The mixture was stirred at room temperature for 24 hours, at the end of which time, 97% of the theoretical amount of hydrogen peroxide had been consumed and titration gave an epoxide value that was 85% of theory. Concentration of the solution yielded 11 g. of crystals. Upon recrystallization from methylene chloride-ether, the crystals had a M.P. of 102.5–103.5° C. Analysis showed the material to be 2,4,6-tris(epoxyethyl)-trioxane.

Calc. for $C_8H_{12}O_6$: percent α-epoxide, 1.39; percent C, 50.0; percent H, 5.6. Anal.: percent α-epoxide, 1.41; percent C, 49.9; percent H, 5.5.

Example VI

When 2,4,6-tris-propenyl-trioxane is dissolved in methanol and is reacted with peracetic acid in the presence of sufficient sodium acetate to maintain a pH greater than 5, good yields of 2,4,6-tris(1,2-epoxypropyl)-trioxane are obtained.

Example VII

Hexahydrophthalic anhydride was mixed with 2,4,6-tris(epoxyethyl)-trioxane in the ratio of 1 mole of anhydride for each mole of epoxide group. To catalyze the cure, 2% by weight of benzyldimethylamine was added and the mixture cured at 125° C. for 4 hours. The resulting resin was a well cured, hard product.

I claim as my invention:

1. The 2,4,6-tris(1,2-epoxyalkyl)-trioxane having the formula

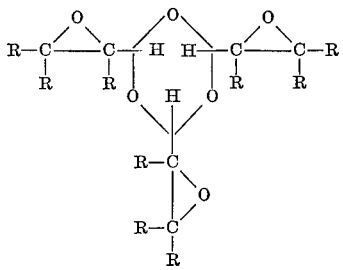

where R is selected from the group consisting of hydrogen, alkyl having from 1 to 10 carbon atoms, and aryl having 6 to 10 carbon atoms.

2. The compound of claim 1 wherein R is alkyl having from 1 to 10 carbon atoms.
3. The compound 2,4,6-tris(1,2-epoxyethyl)-trioxane.
4. The compound 2,4,6-tris(1,2-epoxypropyl)-trioxane.
5. The compound 2,4,6-tris(1,2-epoxy-1-methylethyl)-trioxane.
6. The compound 2,4,6-tris(1,2-epoxy-2-phenylethyl)-trioxane.
7. The infusible product obtained by heating the compound of claim 1 with a polycarboxylic acid anhydride selected from the group consisting of dodecenylsuccinic anhydride, methylnadic anhydride, phthalic anhydride and hexahydrophthalic anhydride.
8. The process for the production of the 2,4,6-tris(1,2-epoxyalkyl)-trioxane having the formula

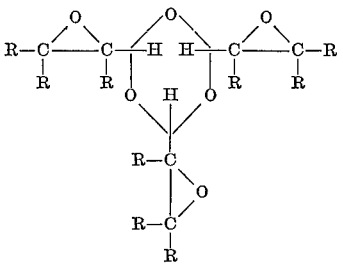

wherein R is selected from the group consisting of hydrogen, alkyl having from 1 to 10 carbon atoms and aryl having from 6 to 10 carbon atoms which comprises reacting α,β-olefinically unsaturated aldehyde of the formula

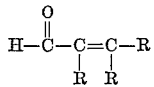

wherein R has the previously stated significance with an up to 50% molar excess of hydrogen halide at a temperature from about 0° C. to about 150° C. to form the corresponding β-haloaldehyde; trimerizing said β-haloaldehyde in the presence of said excess of hydrogen halide at a temperature from −50° C. to 150° C. to form the corresponding 2,4,6-tris(2-haloalkyl)-trioxane; dehydrohalogenating said trioxane in the presence of from 3 to 30 moles of base per mole of said tris(haloalkyl)trioxane at a temperature from 30° C. to 100° C. to form the 2,4,6-tris(1-alkenyl)-trioxane; and epoxidizing the 2,4,6-tris(1-alkenyl)-trioxane at a pH from 4 to 10 and at a temperature from about 15° C. to about 40° C.

9. The process of claim 8 wherein R is alkyl having from 1 to 10 carbon atoms.
10. The process of claim 8 wherein R is hydrogen.

11. The process for the production of the 2,4,6-tris(1,2-epoxyalkyl)-trioxane having the formula

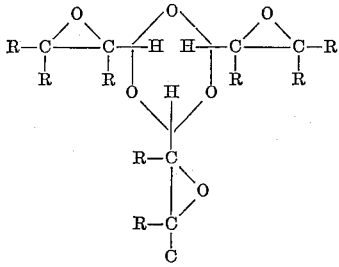

wherein R is selected from the group consisting of hydrogen, alkyl having from 1 to 10 carbon atoms and aryl having 6 to 10 carbon atoms, which comprises reacting α,β-olefinically unsaturated aldehyde of the formula

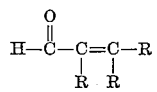

wherein R has the previously stated significance with an up to 50% molar excess of hydrogen halide at a temperature from about 0° C. to about 150° C. to form the corresponding β-haloaldehyde; trimerizing said β-haloaldehyde in the presence of said excess of hydrogen halide at a temperature of from about 0° C. to about 40° C. to form the 2,4,6-tris(2-haloalkyl)-trioxane; reacting said trioxane with alkali metal tert-butoxide solution containing from 3 to 9 moles of said tert-butoxide for each mole of said trioxane, at a temperature from 30° C. to 100° C. to form the 2,4,6-tris(1-alkenyl)-trioxane; and epoxidizing the 2,4,6-tris(1-alkenyl)-trioxane at a pH from 4 to 10 and a temperature from about 15° C. to about 40° C.

12. The process of claim 11 wherein the alkali metal tert-butoxide solution is formed in situ.
13. The process of claim 11 wherein R is hydrogen.
14. The process which comprises reacting α,β-olefinically unsaturated aldehyde of the formula

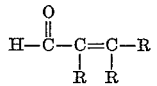

wherein R is selected from the group consisting of hydrogen, alkyl radical having from 1 to 10 carbon atoms and aryl radicals having 6 to 10 carbon atoms, with an up to 50% molar excess of hydrogen chloride at a temperature from about 0° C. to about 150° C. to form the corresponding β-chloroaldehyde; trimerizing the β-chloroaldehyde in the presence of said excess of hydrogen chloride at a temperature of from about −50° C. to about 150° C. to form the corresponding 2,4,6-tris(2-chloroalkyl)-trioxane; and reacting said trioxane with alkali metal tert-butoxide solution containing from 3 to 9 moles of said tert-butoxide for each mole of said trioxane, at a temperature from 30° C. to 100° C. to form 2,4,6-tris(1-alkenyl)-trioxane.

15. The process of claim 14 wherein R is hydrogen.
16. The process for the production of the 2,4,6-tris(1,2-epoxyalkyl)-trioxane having the formula

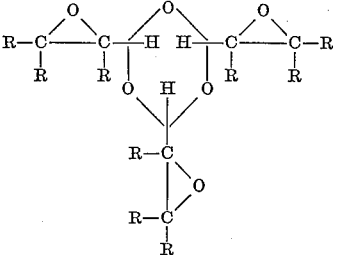

wherein R is selected from the group consisting of hydrogen, alkyl having from 1 to 10 carbon atoms and aryl having from 6 to 10 carbon atoms, which comprises epoxidizing the corresponding 2,4,6-tris(1-alkenyl)-trioxane at a pH from 4 to 10 and at a temperature from about 15° C. to about 40° C.

References Cited by the Examiner

UNITED STATES PATENTS

| | | | |
|---|---|---|---|
| 2,527,806 | 10/1950 | Foster | 260—78.4 |
| 2,965,610 | 12/1960 | Newey | 260—47 |
| 2,991,293 | 7/1961 | Batzer et al. | 260—340.7 |
| 2,998,409 | 8/1961 | Nogare et al. | 260—67 |
| 3,052,650 | 9/1962 | Wear et al. | 260—47 |
| 3,084,168 | 4/1963 | Hearne et al. | 260—340 |
| 3,116,267 | 12/1963 | Dolce | 260—67 |

OTHER REFERENCES

Lee et al., Epoxy Resins, McGraw-Hill Book Co., Inc., New York, 1957, p. 117.

SAMUEL H. BLECH, *Primary Examiner.*

WILLIAM H. SHORT, *Examiner.*

L. M. MILLER, *Assistant Examiner.*